Feb. 17, 1970   W. E. HOWELL   3,495,463
FLUID FILTERING SYSTEM AND FLUID FILTER THEREFOR
Filed Sept. 25, 1967   4 Sheets-Sheet 1
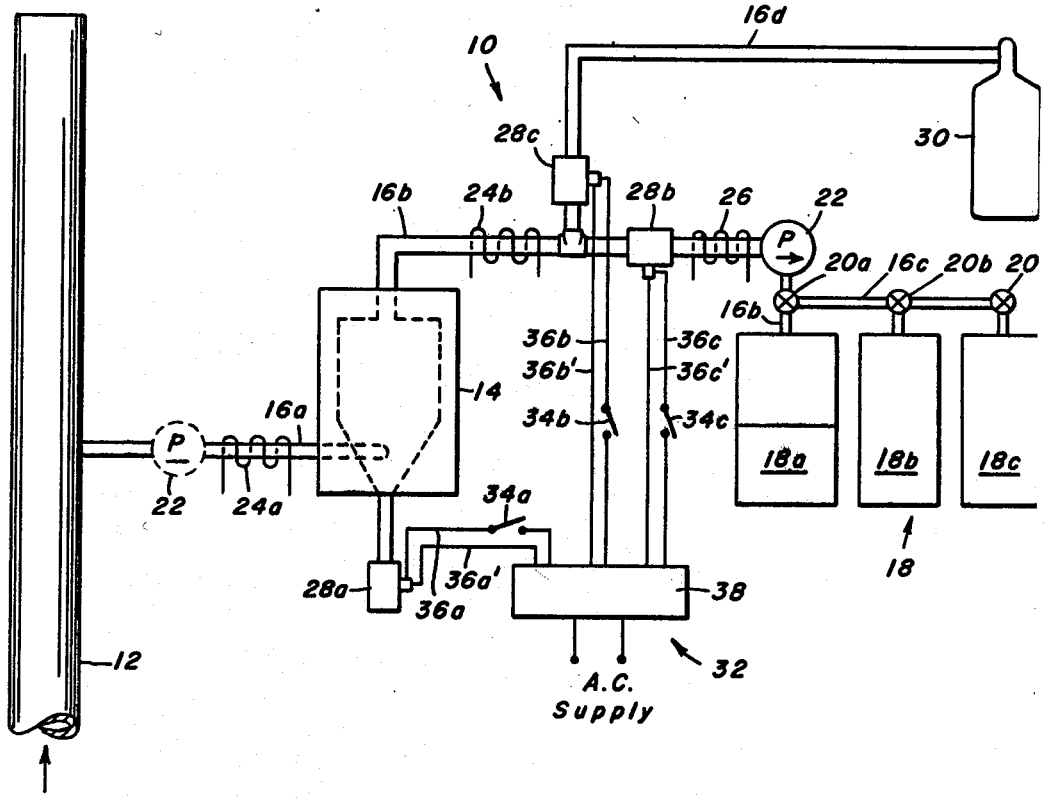
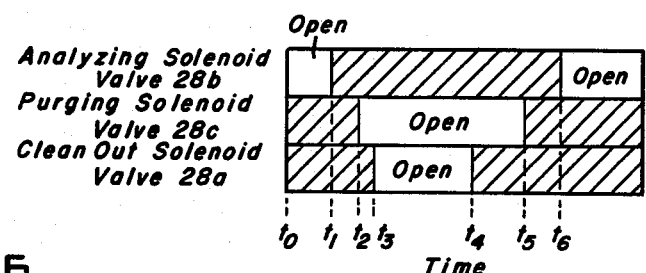
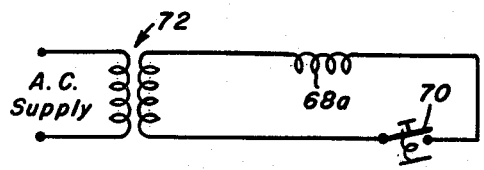
INVENTOR.
WILLIAM E. HOWELL
By Donald G. Dalton
Attorney

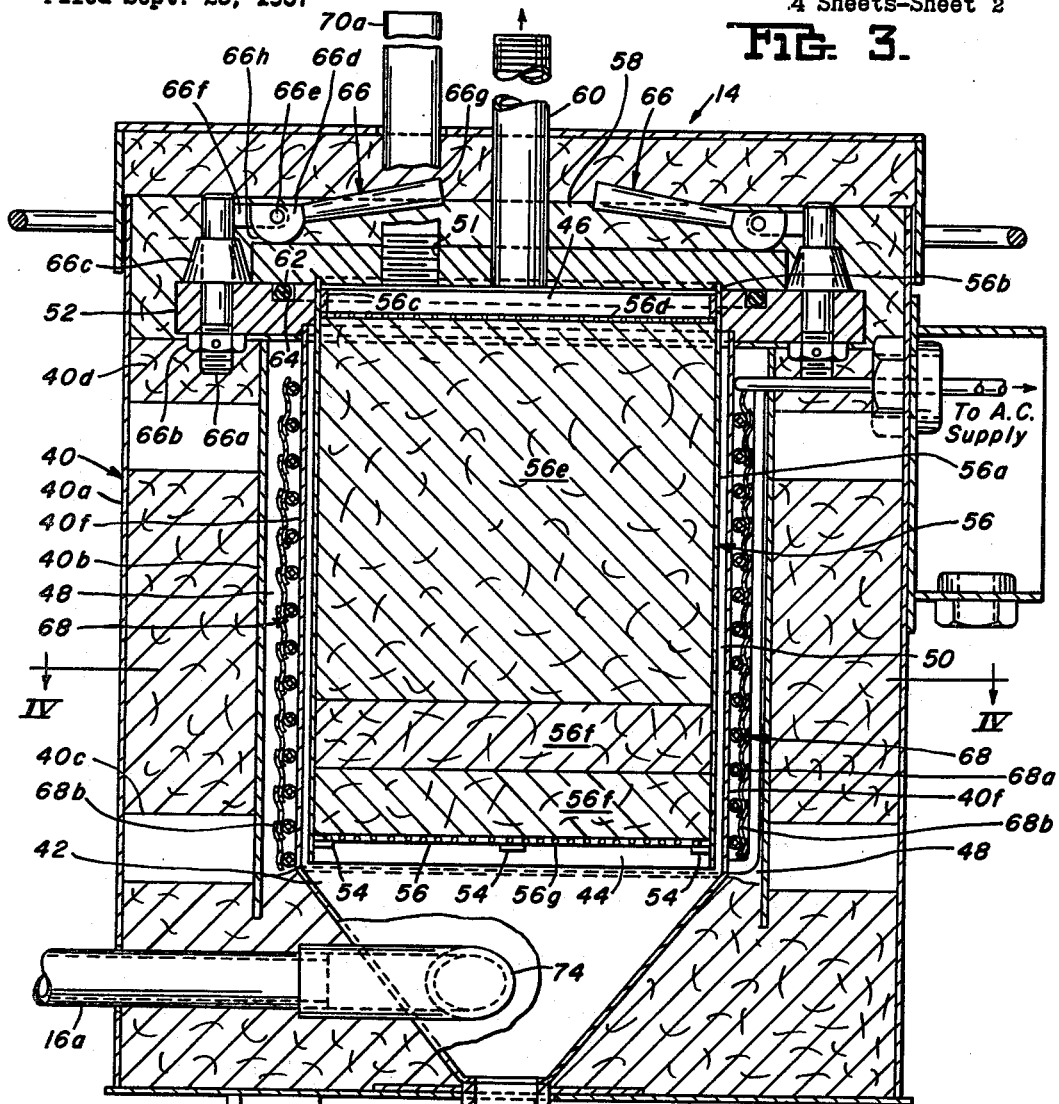

Feb. 17, 1970  W. E. HOWELL  3,495,463
FLUID FILTERING SYSTEM AND FLUID FILTER THEREFOR
Filed Sept. 25, 1967  4 Sheets-Sheet 3

INVENTOR.
WILLIAM E. HOWELL
By Donald G. Dalton
Attorney

Feb. 17, 1970 W. E. HOWELL 3,495,463
FLUID FILTERING SYSTEM AND FLUID FILTER THEREFOR
Filed Sept. 25, 1967 4 Sheets-Sheet 4
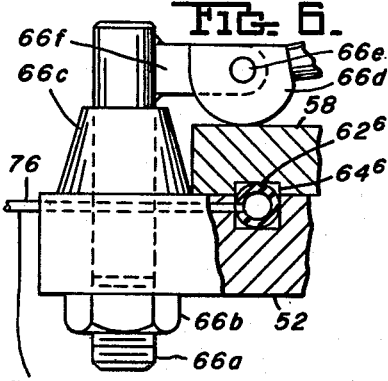
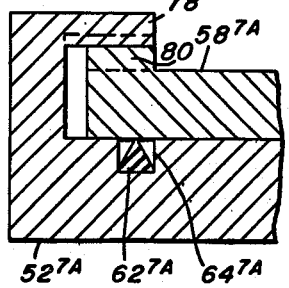
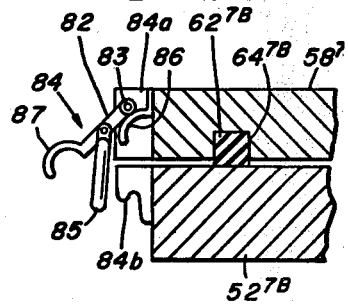
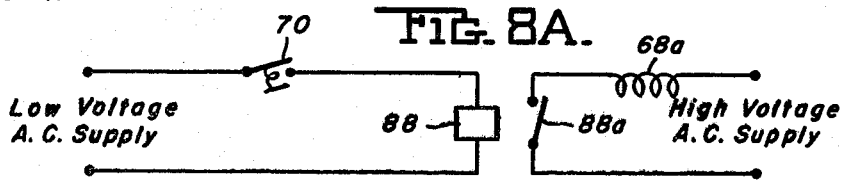
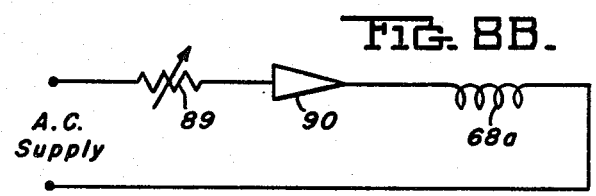
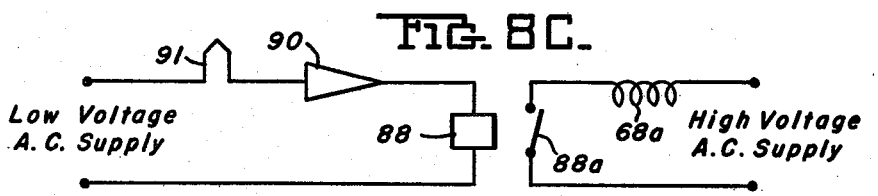
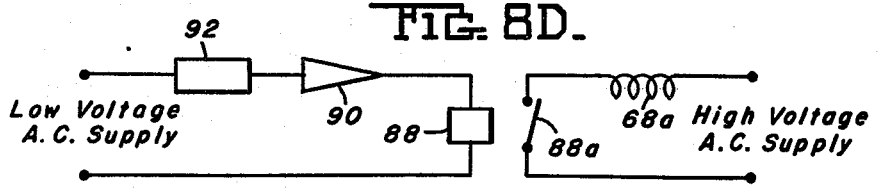
INVENTOR.
WILLIAM E. HOWELL
By Donald G. Dalton
Attorney

United States Patent Office 3,495,463
Patented Feb. 17, 1970

3,495,463
FLUID FILTERING SYSTEM AND FLUID FILTER THEREFOR
William E. Howell, Monroeville Borough, Pa., assignor to United States Steel Corporation, a corporation of Delaware
Filed Sept. 25, 1967, Ser. No. 670,047
Int. Cl. G01n 1/22
U.S. Cl. 73—421.5                13 Claims

ABSTRACT OF THE DISCLOSURE

An improved fluid filtering system and fluid filter therefor adapted to clean all types of fluid samples without altering the moisture content of such fluid samples, thereby permitting the analysis of such fluid samples by analytical instruments. This fluid filtering system for analyzing the content of a fluid sample has a sample source, a fluid filter connected to the sample source for cleaning the fluid sample, analyzing means connected to the fluid filter for analyzing the fluid sample, and pump means disposed between one of the sample source and the fluid filter and the fluid filter and the analyzing means for moving the fluid sample through the fluid filter and the analyzing means.

The improved fluid filter for removing the deleterious solid matter from the fluid sample has housing means provided with a filter cartridge cavity having an inlet end and an outlet end, the housing means having a peripheral sealing member on one of the inlet end and the outlet end. Support means are on one of the inlet end and the outlet end of the housing means. A filter cartridge is on the support means and is in the filter cartridge cavity. A sealing cover member engages the peripheral sealing member and has an opening in communication with such one of the inlet end and the outlet end. Sealing means are disposed between the peripheral sealing member and the sealing cover member, and clamping means are on one of the peripheral sealing member and the sealing cover member for engaging the other of the peripheral sealing member and the sealing cover member and for clamping the peripheral sealing member to the sealing cover member so that the sealing means hermetically seals the peripheral sealing member to the sealing cover member.

BACKGROUND OF THE INVENTION

Conventional gas filters do not operate satisfactorily in a vacuum-type sampling system because of inadequate sealing which allows infiltration of air to alter the gas sample prior to analysis. Additionally, the filter cartridge of the conventional gas filter is difficult to remove because of the tendency of the threaded fasteners (utilized to secure the filter cartridge to the housing of the filtering apparatus) to seize when the conventional gas filter is subjected to high temperatures. Further, conventional gas filters do not provide automatic temperature control to maintain the gas sample above its dew point.

The pressure-type conventional gas filter uses a pump to force the gas, which contains abrasives, through the filter whereas the vacuum-type gas filter uses a pump to draw the gas, free of abrasives, from the filter. Thus a vacuum system reduces pump wear since such pump is not subjected to an abrasive-laden gas.

OBJECTS OF THE INVENTION

It is the general object of the present invention to avoid and overcome the foregoing and other difficulties of and objections to prior art practices by the provision of an improved fluid filtering system and an improved fluid filter therefor which:

(1) are simple and rugged in construction;
(2) provide adequate sealing and prevent infiltration of air into the fluid filter and into the fluid sample;
(3) has a filter cartridge with is readily removable from the fluid filter at high operating temperatures;
(4) provide automatic temperature control to maintain the fluid sample above its dew point; and
(5) eliminate abrasion and wear in the associated pump.

BRIEF SUMMARY OF THE INVENTION

The aforesaid objects of this invention, and other objects which will become apparent as the description proceeds, are achieved by providing an improved fluid filtering system and fluid filter therefor. This fluid filtering system for analyzing the content of a fluid sample has a sample source, a fluid filter connected to the sample source for cleaning the fluid sample, analyzing means connected to the fluid filter for analyzing the fluid sample, and pump means disposed between one of the sample source and the fluid filter and the fluid filter and the analyzing means for moving the fluid sample through the fluid filter and the analyzing means.

The improved fluid filter for removing the deleterious solid matter from the fluid sample has housing means provided with a filter cartridge cavity having an inlet end and an outlet end, the housing means having a peripheral sealing member on one of the inlet end and the outlet end. Support means are on such one of the inlet end and the outlet end of the housing means. A filter cartridge is on the support means and is in the filter cartridge cavity. A sealing cover member engages the peripheral sealing member and has an opening in communication with the one of the inlet end and the outlet end. Sealing means are disposed between the peripheral sealing member and the sealing cover member, and clamping means are on one of the peripheral sealing member and the sealing cover member for engaging the other of the peripheral sealing member and the sealing cover member and for clamping the peripheral sealing member to the sealing cover member so that the sealing means hermetically seals the peripheral sealing member to the sealing cover member.

BRIEF DESCRIPTION OF THE SEVERAL VIEWS OF THE DRAWINGS

For a better understanding of this invention reference should be had to the accompanying drawings, wherein like numerals of reference indicate similar parts throughout the several views and wherein:

FIGURE 1 is a diagrammatic view of the improved fluid filtering system of this invention;

FIGURE 2 is a timing diagram for the fluid filtering system shown in FIGURE 1;

FIGURE 3 is a vertical cross sectional view of the improved fluid filter utilized in the fluid filtering system of FIGURES 1, 2;

FIGURE 3A is a fragmentary cross sectional view of an alternative embodiment of a supporting means for a bottom screen for the fluid filter;

FIGURE 3B is a fragmentary cross sectional view of an alternative embodiment of the supporting means for a fluid filter cartridge;

FIGURE 5 is a schematic diagram of the heating means;

FIGURE 6 is a fragmentary cross sectional view similar to a portion of FIGURE 3 of an alternative embodiment of the sealing means;

FIGURES 7A, 7B are fragmentary cross sectional views of alternative embodiments of the clamping mechanism;

FIGURES 8A, 8B, 8C, 8D are schematic diagrams of alternative heating means; and

Figure 4:
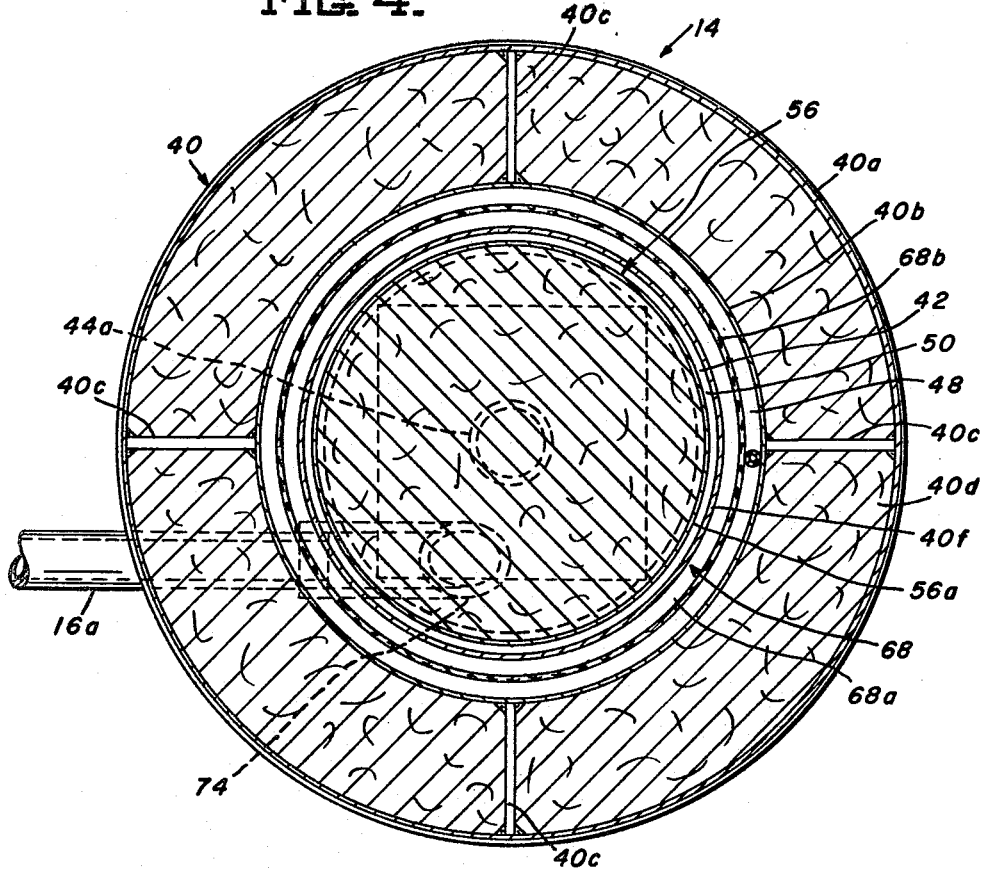
FIGURE 4 is a horizontal cross sectional view of the fluid filter taken along the line IV—IV of FIGURE 3 in the direction of the arrows.

Although the principles of this invention are broadly applicable to a fluid filtering system and to an improved filter therefor, this invention is particularly adapted for use in conjunction with a gas filtering system and with a gas filter therefor for sampling the gas from the top of a blast furnace or the stack of an open hearth furnace and hence it has been so illustrated and will be so described.

DETAILED DESCRIPTION

With specific reference to the form of this invention illustrated in the drawings, and referring particularly to FIGURE 1, a fluid filtering system for analyzing the content of a fluid sample is indicated generally by the reference numeral 10.

This fluid filtering system 10 has a sample source 12, (FIGURE 1), such as a blast furnace top, an open hearth stack or the like. For the purpose of removing deleterious undesirable solid material from the fluid sample from the sample source 12, a fluid filter 14 (FIGURES 1, 3, 4) is connected by a pipe 16a (FIGURES 1, 3, 4) to the sample source 12. Analyzing means 18 (FIGURE 1) are connected by a pipe 16b to the fluid filter 14 for analyzing the fluid sample. The analyzing means 18 are of the type manufactured by the Mine Safety Appliances Company, Pittsburgh, Pa., as a Model 200 Lira infrared analyzer or the like. Lira is a trade name of the Mine Safety Appliances Company. Such analyzing means 18 (FIGURE 1) may comprise a single analyzer 18a for oxygen content or a plurality of similar analyzers 18a for the oxygen content, 18b for the carbon dioxide and 18c for the carbon monoxide content in the fluid sample. A valve 20a (FIGURE 1) in the line 16b for the analyzer 18a and valve 20b in the branch line 16c for analyzer 18b and the valve 18c in the branch line 16c for analyzer 18c selectively connect the analyzers 18b, 18c into the fluid filtering system 10 as desired. In order to move the fluid sample through the fluid filter 14 and the analyzing means 18, pump means, such as a pump 22 (FIGURE 1) is disposed in either the line 16a between the sample source 12 and the fluid filter 14 (as indicated by the dotted lines in FIGURE 1) or in the line 16b between the fluid filter 14 and the analyzing means 18 (as indicated by the solid lines in FIGURE 1).

In addition, the fluid filtering system 10 has a first heating means, such as the heating coil 24a (FIGURE 1) about the line 16a, and a second heating means, such as the heating coil 24b about the line 16b both for maintaining the fluid (sample in this case blast furnace top or open hearth stack gas) above its dew point. Further, for the purpose of cooling the fluid sample, cooling means, such as a cooling coil 26, is disposed about the line 16b between the fluid filter 14 and the analyzing means 18.

As shown in FIGURE 1, the fluid filtering system 10 has a first valve means, such as the clean-out solenoid valve or solenoid-operated clean-out valve 28a, on the fluid filter 14 for alternately retaining therein and removing therefrom solid material. In order to control the flow of fluid sample to the anlyzing means 18, a second valve means, such as the analyzing solenoid valve or solenoid-operated analyzing valve 28b is disposed in the line 16b between the fluid filter 14 and the analyzing means 18. For the purpose of purging the fluid filter 14, a purging source, such as an inert gas source or tank 30 (FIGURE 1) of nitrogen or the like, is connected to the line 16b by a line 16d through a third valve means, such as the purging solenoid valve or solenoid-operated purging valve 28c (disposed in the line 16d betwen the fluid filter 14 and the tank 30). The solenoid-operated valve 28c controls the flow of purging gas to the fluid filter 14.

The control means 32, employed by the fluid filtering system 10 for timing the operation of the valves 28a, 28b, 28c may comprise a manually-operated switch 34a (FIGURE 1) in line 36a of lines 36a, 36a' extending from solenoid-operated valve 28a (FIGURES 1, 4) to a suitable source of voltage indicated by the legend "AC Supply"; a switch 34b in line 36b of lines 36b, 36b'; and a switch 34c in line 36c of lines 36c, 36c'. Alternatively the control means 32 may utilize an automatic program timer 38 (FIGURE 1) of the type manufactured by Industrial Timer Corporation, Los Angeles, Calif., as a synchronous motor-driven programming cam timer of the multi-switch type and identified as Series MC.

OPERATION

Referring now to the timing diagram of FIGURE 2, at time $t_0$ the analyzing valve 28b (FIGURE 1) is open and the purging valve 28c and clean-out valve 28a are closed, thereby permitting attendant analysis of the fluid sample by the analyzing means 18. At time $t_1$ the analyzing valve 28b closes. Purging of the fluid filtering system 10 begins at time $t_2$ when the purging valve 28c opens, thus permitting purging gas to flow back through the fluid filter 14 and the line 16a and permitting solid deleterious material to collect in the bottom or trap 44a (FIGURE 3) of the fluid filter 14. For the purpose of cleaning out the bottom 44a of the fluid filter 14, clean-out valve 28a remains open during the period $t_3$–$t_4$. Thereafter the purging continues with the clean-out valve 28a closed until time $t_5$ when the purging valve 28c closes. At time $t_6$ the analyzing valve 28b opens and analysis of the fluid sample resumes.

Having described the fluid filtering system 10, reference is now made to the improved fluid filter 14 shown in FIGURES 3, 4.

FLUID FILTER 14

This fluid filter 14 has housing means, such as the housing 40 (FIGURES 3, 4) provided with a filter cartridge cavity 42 having an inlet end 44 (FIGURE 3) and an outlet end 46. The housing 40 has an outer shell 40a (FIGURES 3, 4) connected to a first inner shell 40b by ribs 40c, insulated from each other by suitable insulation, such as asbestos 40d or the like and mounted on a plurality of legs 40e (FIGURE 3). This first inner shell 40b defines with a second inner shell 40f (FIGURES 3, 4) a heater cable cavity 48 and such second inner shell 40f defines the filter cartridge cavity 42.

The housing 40 has a peripheral sealing member 52 (FIGURE 3) on one of the inlet end 44 and the outlet end 46 of the filter cartridge cavity 42, in this case the outlet end 46. Support means are provided for supporting a filter cartridge 56 in the filter cartridge cavity 42. In the showing of FIGURES 3, 4, a shell 56a of the filter cartridge is welded at 56b to a sealing cover member 58 to provide the required support for the filter cartridge 56.

Referring to FIGURES 3, 4, the filter cartridge 56 has a spacer ring 56c (FIGURE 3) for spacing a top screen 56d from an outlet 60 in the sealing cover member 58 and for keeping a fine filtering media 56e from clogging the opening 60. This fine filtering media 56e may be Fiberfrax, the trade name of a cotton-like ceramic-type filtering media manufactured by the Carborundum Company, Perth Amboy, N.J. Below the fine filtering media 56e a plurality of layers of coarse filtering media 56f (suitably Fiberglas strips) is retained therein by a bottom screen 56g, which bottom screen 56g is peripherally slotted (not shown) at spaced or quadrantial intervals to permit such slots to clear supporting tabs 54. The tabs 54 are formed from the shell 56a or welded thereto. After clearing the tabs 54 the slots (not shown) are rotated to permit the tabs 54 to support the bottom screen 56g.

The sealing cover member 58 is engageable with the peripheral sealing member 52 and is provided with the opening or outlet 60 in communication with the outlet end 46 of the filter cartridge cavity 42.

Sealing means, such as an O-ring 62 (FIGURE 3), is disposed in a peripheral slot 64 in either the peripheral sealing member 52 or the sealing cover member 58 or both (in this case in the peripheral sealing member 58). In order to hermetically seal the peripheral sealing member 52 to the sealing cover member 58, clamping means, such as a clamping mechanism 66 (FIGURE 3) on one of the peripheral sealing member 52 and the sealing cover member 58 (in this case the peripheral sealing member 52) engages the other of the peripheral sealing member 52 and the sealing cover member 58 (in this case the sealing cover member 58) to clamp and hermetically seal the sealing cover member 58 (with the O-ring 62 therebetween) to the peripheral sealing member 52.

CLAMPING MECHANISM 66

This clamping mechanism 66 (FIGURE 3) has a plurality of clamps, such as four clamps, each having a mounting member, such as the threaded bolt 66a secured by a nut 66b to the peripheral sealing member 52 and extending from the peripheral sealing member 52 toward the sealing cover member 58. In order to guide the sealing cover member 58 into position on the peripheral sealing member 52, a spacer member, such as the tapered spacer 66c is disposed on the bolt 66a. For the purpose of sealing the O-ring 62 between the sealing cover member 58 and the peripheral sealing member 52, a cam locking member, such as a cam lock 66d, is pivotable at 66e on an arm 66f projecting from the free end of the bolt 66a. Clockwise movement of the lever 66g (as viewed in FIGURE 3) locks the cam 66h of the cam lock 66d against the sealing cover member 58.

The structure utilized for uniformly heating the heating chamber 50 (defined by the second inner shell 40f and the shell 56a of the filter cartridge 56) and the filter cartridge 56 is a heating means 68.

HEATING MEANS 68

This heating means 68 (FIGURES 3, 5) has a heating coil 68a (insulated by asbestos cloth 68b) in series with a first control means, such as a thermostat 70 (FIGURE 5) controlled by the vapor pressure of a liquid, such as mercury or by the differential expansion of solids, such as a bimetal. The heating coil 68a and thermostat 70 connected directly to the "AC Supply" or through a transformer 72 as shown in FIGURE 5. A suitable thermostat 70 is a differential expansion thermoswitch unit or the like manufactured by Fenwal Incorporated, Ashland, Mass. Such thermostat 70 is secured in a threaded socket 70a (FIGURE 3) in the sealing cover member 58 and having threads 51.

For the purpose of efficiently settling out the deleterious solid material, such as dirt, soot and the like, the inlet end 44 of the filter cartridge cavity 42 is provided with a tangential inlet 74 (FIGURES 3, 4) from the pipe 16a (FIGURE 1) to create a vortex effect within such inlet end 44. As shown in FIGURE 3, the inlet end 44 is conical in shape and is provided with the clean-out pipe 44a leading to the clean-out valve 28a. Alternatively the inlet end 44 may be cylindrical or arcuate (either concave or convex) in vertical cross section.

ALTERNATIVE EMBODIMENTS

It will be understood by those skilled in the art that alternatively as shown in FIGURE 3A that the supporting means for the bottom screen 56g may be protuberances 54a formed from the shell 56a of the filter cartridge 56.

Referring to FIGURE 3B and the alternative embodiment of the supporting means for the filter cartridge 56, the bottom of the shell 56a of the filter cartridge 56 is supported by a stop means, such as a peripheral plate or support ring 75, which ring 75 may be circumferential or formed of a series of spaced sectors and is welded at 75a to the second inner shell 40f of the housing 40. The top of the shell 56a is hermetically sealed to the sealing cover member 58 by an O-ring 62a disposed in a slot 64a in the sealing cover member 58.

As shown in FIGURE 6 the sealing means may comprise a hollow donut $62^6$ filled with a gas, such as a liquid such as oil. Further the donut $62^6$ may be inflatable and connected by a line 76 to a high pressure gas or liquid supply. In addition the O-ring 62 of FIGURE 3 may be formed in any desired shape (i.e. circular, rectangular, square or triangular cross section as the rings $62^{7A}$, FIGURE 7A) or of any resilient material, such as rubber or the like. One-shot soft metal sealing means, formed from aluminum, copper or the like may also be employed.

In FIGURE 7A each clamp has a mounting member, such as the arm 78 extending from one of the peripheral sealing member $52^{7A}$ and the sealing cover member $58^{7A}$ (in this case the peripheral sealing member $52^{7A}$). The sealing cover member 587A carries a wedge 80 which is rotated into locking engagement with the arm 78. Alternatively both the arm 78 and sealing cover member $58^{7A}$ can be provided with wedges 80.

FIGURE 7B provides a plurality of clamps 84 each having an arm member 82 pivotable at 83 on a lug 84a on one of the peripheral sealing member $52^{7B}$ and the sealing cover member $58^{7B}$ (i.e. in this case on the sealing cover member $58^{7B}$). The latch 85 engages and locks against another lug 84b on the peripheral sealing member $52^{7B}$. A leaf spring 86 biases the clamp and a handle 87 is provided on the latch 85.

Althernatively as shown in FIGURE 8A the thermostat 70 is connected in series with a relay 88 to a low voltage AC supply and its normally open contact 88a is in series with the heating coil 68a and a high voltage AC supply.

In FIGURE 8B a thermister 89, an electrical resistor made of a material whose resistance varies sharply in a known manner with the temperature, is connected in series with an amplifier 90, the heating coil 68a and the AC supply. The thermister 89 may be a Series 802PTC thermister of the type manufactured by Westinghouse Electric Corporation or the like. The amplifier 90 may be an input signal conversion type 19–101 millivolt preamplifier or the like manufactured by Consolidated Electrodynamics Division, Kinetics Control Equipment Company, Bridgeport, Conn.

A thermocouple 91 (FIGURE 8C) having two electrical conductors of dissimilar metals (i.e. copper and iron for example), joined at the point where the temperature is to be measured and having its free ends connected to an amplifier 90 is shown in FIGURE 8C.

Figure 9:
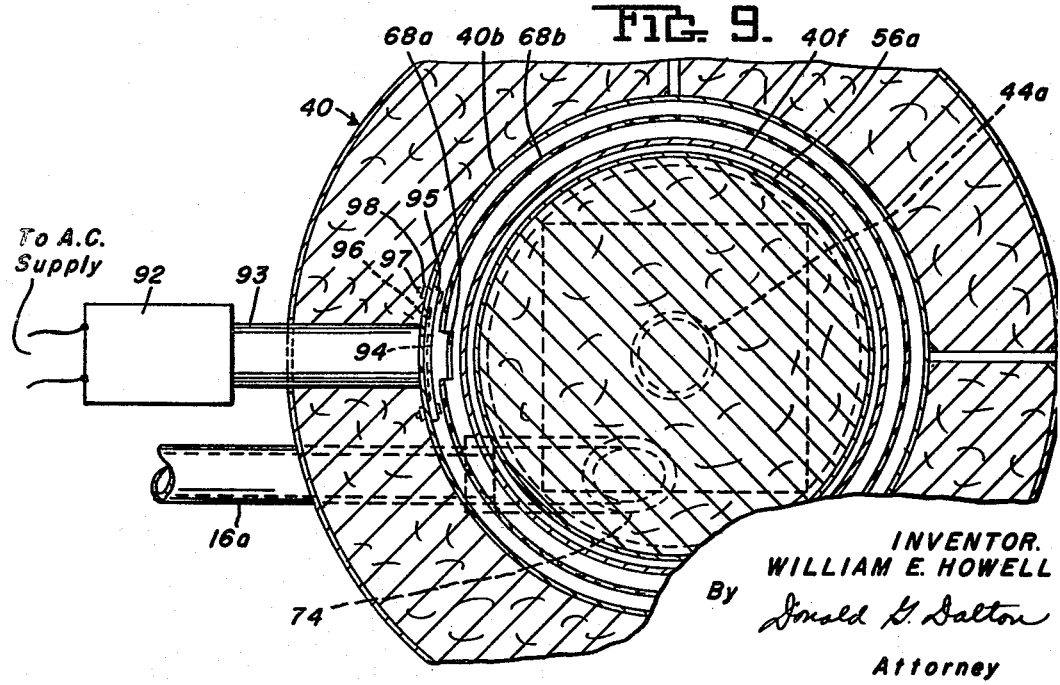
FIGURE 9 is a plan view of an optical-type control means employed in FIGURE 8D.

Referring now to FIGURES 8D and 9, an optical pyrometer 92 of the type manufactured by Huggins Laboratory, Inc., Sunnyvale, Calif., as a Mark I general purpose radiation thermometer is employed. As shown in FIGURE 9 the pyrometer 92 is mounted in a sight tube 93 extending through the housing 40 and having a high temperature vitreous window 94 (suitably quartz or the like) hermetically sealed to the first inner shell 40b by means of a sealing ring 95, O-ring 96 and bolts 97 and nuts 98.

SUMMARY OF THE ACHIEVEMENT OF THE OBJECTS OF THE INVENTION

It will be recognized by those skilled in the art that the objects of this invention have been achieved by providing an improved fluid filtering system 10 (FIGURES 1–9) and fluid filter 14 therefor which are simple and rugged in construction; provide adequate sealing and prevent infiltration of air into the fluid filter 14 and into the fluid sample; have a filter cartridge 56 which is readily removable from the fluid filter 14 at high operating temperatures; provide automatic temperature control to maintain the fluid sample above its dew point; and eliminate abrasion and wear in the associated pump 22.

While in accordance with the patent statutes preferred and alternative embodiments of this invention have been illustrated and described in detail, it is to be particularly understood that the invention is not limited thereto or thereby.

I claim:
1. A fluid filter for removing deleterious solid matter from a fluid sample and having:
  (a) housing means provided with a filter cartridge cavity having an inlet end and an outlet end;
  (b) a peripheral sealing member on one end of said inlet end and said outlet end;
  (c) a sealing cover member concentric with said peripheral sealing member and engageable with said peripheral sealing member;
    (1) said peripheral sealing member and said sealing cover member being provided with an opening in communication with said one end of said inlet end and said outlet end;
  (d) support means on one member of said sealing cover member and said peripheral sealing member;
  (e) a filter cartridge on said support means and in said filter cartridge cavity;
  (f) sealing means disposed between said peripheral sealing member and said sealing cover member;
  (g) stop means on said housing means at the other end of said inlet end and said outlet end and engageable with said filter cartridge for urging said filter cartridge against said one member of said sealing cover member and said peripheral sealing member; and
  (h) clamping means on the other member of said peripheral sealing member and said sealing cover member for engaging said one member of said peripheral sealing member and said sealing cover member and for clamping together said peripheral sealing member and said sealing cover member so that said sealing means hermetically seals said peripheral sealing member to said sealing cover member.

2. The fluid filter recited in claim 1 wherein said support means connects said end sealing cover member to said fluid filter.

3. The fluid filter recited in claim 1 wherein said sealing means is an O-ring.

4. The fluid filter recited in claim 1 wherein said sealing means is an inflatable ring filled with a fluid.

5. The fluid filter recited in claim 1 wherein said sealing means is an inflatable ring filled with a gas.

6. The fluid filter recited in claim 1 wherein said sealing means is an inflatable ring filled with a liquid.

7. The fluid filter recited in claim 1 wherein said clamping means has a plurality of clamps each having a mounting member extending from said one member of said peripheral sealing member and said sealing cover member toward said other member of said peripheral sealing member and said sealing cover member, a spacer member on said mounting member to position said other member on said one member and a cam locking member pivotable on said mounting member and engageable with said other member to force said filter cartridge against said stop means and to seal said sealing means between said peripheral sealing member and said sealing cover member.

8. The fluid filter recited in claim 1 and having heating means in said housing means adjacent said filter cartridge for heating said filter cartridge and control means connected to said heating means for providing uniform heating of said filter cartridge.

9. The fluid filter recited in claim 8 wherein said control means is a thermostat.

10. The fluid filter recited in claim 8 wherein said control means is relay controlled.

11. The fluid filter recited in claim 1 wherein said inlet end of said housing means has a tangential inlet to create a vertex flow of said fluid sample to facilitate the removal of deleterious solid matter from said fluid filter.

12. The fluid filter recited in claim 11 wherein said inlet end is conical.

13. A fluid filtering system for analyzing the content of a fluid sample and having:
  (a) a sample source;
  (b) a fluid filter connected to said sample source for removing solid material from said fluid sample;
  (c) analyzing means connected to said fluid filter for analyzing said fluid sample; and
  (d) pump means disposed between one of said sample source and said fluid filter and said fluid filter and said analyzing means for moving said fluid sample through said fluid filter and said analyzing means,
    (1) said fluid filter having:
      (a) housing means provided with a filter cartridge cavity having an inlet end and an outlet end;
      (b) a peripheral sealing member on one end of said inlet end and said outlet end;
      (c) a sealing cover member concentric with said peripheral sealing member and engageable with said peripheral sealing member,
        (1) said peripheral sealing member and said sealing cover member being provided with an opening in communication with said one end of said inlet end and said outlet end;
      (d) support means on one member of said sealing cover member and said peripheral sealing member;
      (e) a filter cartridge on said support means and in said filter cartridge cavity;
      (f) sealing means disposed between said peripheral sealing member and said sealing cover member;
      (g) stop means on said housing means at the other end of said inlet end and said outlet end and engageable with said filter cartridge for urging said filter cartridge against said one member of said sealing cover member and said peripheral sealing member; and
      (h) clamping means on said one member of said peripheral sealing member and said sealing cover member for engaging the other member of said peripheral sealing member and said sealing cover member and for clamping together said peripheral sealing member and said sealing cover member so that said sealing means hermetically seals said peripheral sealing member to said sealing cover member.

(References on following page)

References Cited

UNITED STATES PATENTS

| | | | |
|---|---|---|---|
| 1,646,404 | 10/1927 | Herbert | 210—454 X |
| 1,661,104 | 2/1928 | Barneby | 55—269 X |
| 1,860,778 | 5/1932 | Howard | 55—503 |
| 2,009,352 | 7/1935 | Adams | 55—269 |
| 2,327,111 | 8/1943 | Kimmell | 73—422 |
| 2,641,364 | 6/1953 | Depallens | 55—503 |
| 2,982,131 | 5/1961 | Rosinski | 73—421.5 |
| 3,304,783 | 2/1967 | Quigley | 73—421.5 |
| 3,307,335 | 3/1967 | Shomaker | 73—421.5 |
| 1,029,013 | 6/1912 | Hiser | 292—257 |
| 1,106,641 | 8/1914 | Fackenthal | 210—454 |
| 2,559,564 | 6/1951 | Sperling | 277—226 |
| 2,814,517 | 11/1957 | Razdow | 277—226 |
| 3,147,016 | 9/1964 | Traufler | 277—226 |

FOREIGN PATENTS 1,490,001   6/1967   France.

S. CLEMENT SWISHER, Primary Examiner

U.S. Cl. X.R.

55—267, 502

UNITED STATES PATENT OFFICE
CERTIFICATE OF CORRECTION

Patent No. 3,495,463                          February 17, 1970

William E. Howell

It is certified that error appears in the above identified patent and that said Letters Patent are hereby corrected as shown below:

Column 3, line 73, before "sample" cancel the opening parenthesis and insert the same before "in", same line 73. Column 6, line 26, before "a liquid" insert -- air or --; line 39, "587A" should read -- $587^A$ --; line 51, "Althernatively" should read -- Alternatively --.

Signed and sealed this 1st day of December 1970.

(SEAL)
Attest:

Edward M. Fletcher, Jr.                     WILLIAM E. SCHUYLER, JR.
Attesting Officer                               Commissioner of Patents